(12) United States Patent
Scheid et al.

(10) Patent No.: US 10,977,877 B2
(45) Date of Patent: *Apr. 13, 2021

(54) ENGINE GATEWAY WITH ENGINE DATA STORAGE

(71) Applicant: United Technologies Corporation, Farmington, CT (US)

(72) Inventors: Paul Raymond Scheid, West Hartford, CT (US); Jason E. Posniak, Broad Brook, CT (US); William C. Lamberti, Wethersfield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,081

(22) Filed: Jul. 3, 2019

(65) Prior Publication Data

US 2020/0334925 A1 Oct. 22, 2020

Related U.S. Application Data

(60) Provisional application No. 62/835,169, filed on Apr. 17, 2019.

(51) Int. Cl.
*G07C 5/00* (2006.01)
*H04L 12/417* (2006.01)
(Continued)

(52) U.S. Cl.
CPC ............ *G07C 5/008* (2013.01); *H04L 12/417* (2013.01); *H04L 12/66* (2013.01); *H04L 67/125* (2013.01);
(Continued)

(58) Field of Classification Search
CPC ......... G06N 3/08; G05B 19/02; H04W 40/26; H04W 4/80; H04B 7/005; G08B 19/00;
(Continued)

(56) References Cited

U.S. PATENT DOCUMENTS 6,167,239 A 12/2000 Wright et al.
6,173,159 B1 1/2001 Wright et al.
(Continued)

FOREIGN PATENT DOCUMENTS

EP 1400942 A2 3/2004
EP 2378490 A1 10/2011
(Continued)

OTHER PUBLICATIONS

Extended European Search Report; dated Sep. 8, 2020; Application No. 20167253.2—1202; 10 pages.
(Continued)

*Primary Examiner* — Iqbal Zaidi
(74) *Attorney, Agent, or Firm* — Cantor Colburn LLP

(57) ABSTRACT

An engine gateway of a gas turbine engine of an aircraft includes a communication interface configured to wirelessly communicate with an offboard system and to communicate with an engine control of the gas turbine engine, a memory system, a data storage system isolated from the memory system, and processing circuitry. The processing circuitry is configured to establish communication with the engine control on a first communication bus using system credential authentication, establish communication between the engine control and the data storage system on a second communication bus, establish wireless communication with the offboard system using system credential authentication, and provide access from the offboard system through the engine gateway, from the engine gateway through the engine control, and from the engine control to the data storage system
(Continued)

to enable one or more updates of the data storage system by the offboard system based on service credential authentication.

22 Claims, 4 Drawing Sheets

(51) Int. Cl.
*H04L 12/66* (2006.01)
*H04L 29/08* (2006.01)
*H04L 12/40* (2006.01)

(52) U.S. Cl.
CPC ...... *H04L 67/34* (2013.01); *H04L 2012/4028* (2013.01)

(58) Field of Classification Search
CPC .... H02J 9/06; G05D 1/00; G08G 5/00; F41H 11/00
See application file for complete search history.

(56) References Cited

U.S. PATENT DOCUMENTS

| | | | |
|---|---|---|---|
| 8,078,354 | B2 | 12/2011 | Loda |
| 8,344,912 | B2 | 1/2013 | Mitchell et al. |
| 8,768,537 | B2 | 7/2014 | Kim et al. |
| 9,303,523 | B2 | 4/2016 | Rodriguez et al. |
| 9,367,970 | B2 | 6/2016 | Ziarno |
| 9,435,819 | B1 | 9/2016 | Fraley et al. |
| 9,464,905 | B2 | 10/2016 | Lewis |
| 9,587,576 | B2 * | 3/2017 | Stanek ............... F02D 41/30 |
| 9,915,535 | B2 | 3/2018 | Jordan et al. |
| 10,035,609 | B2 | 7/2018 | Ziarno |
| 10,093,436 | B2 | 10/2018 | Bulumulla et al. |
| 10,114,634 | B2 | 10/2018 | Quin et al. |
| 2004/0056766 | A1 | 3/2004 | Butz et al. |
| 2004/0206818 | A1 | 10/2004 | Loda et al. |
| 2009/0119657 | A1 | 5/2009 | Link, II |
| 2010/0049377 | A1 | 2/2010 | Scheid et al. |
| 2017/0373612 | A1 | 12/2017 | Sellinger et al. |
| 2018/0006916 | A1 | 1/2018 | Scholten et al. |
| 2018/0007136 | A1 | 1/2018 | Scholten et al. |
| 2018/0011481 | A1 | 1/2018 | Smit et al. |
| 2018/0170575 | A1 | 6/2018 | Ziarno |
| 2018/0205658 | A1 | 7/2018 | Sullivan |
| 2019/0005744 | A1 | 1/2019 | Curtis et al. |
| 2019/0012853 | A1 | 1/2019 | Scholten et al. |
| 2019/0128191 | A1 | 5/2019 | Moravek et al. |
| 2019/0322299 | A1 * | 10/2019 | Mong ................. B61L 15/0036 |
| 2019/0385057 | A1 * | 12/2019 | Litichever .......... H04L 63/1416 |
| 2020/0076596 | A1 | 3/2020 | Chopart |

FOREIGN PATENT DOCUMENTS

| | | | |
|---|---|---|---|
| EP | 3217364 | A2 | 9/2017 |
| EP | 3260939 | A1 | 12/2017 |
| WO | 2010028729 | A1 | 3/2010 |
| WO | 2018158102 | A1 | 9/2018 |

OTHER PUBLICATIONS

Extended European Search Report; dated Oct. 2, 2020; Application No. 20170071.3—1202; 11 pagaes.
Extended European Search Report; dated Sep. 25, 2020; Application No. 20170066.3—1009; 12 pages.
Extended European Search Report; dated Sep. 18, 2020; Application No. 20167001.5—1009; 9 pages.
Partial European Search Report; Application No. 20170098.6—1202; dated Sep. 21, 2020; 16 pages.
Cfmi Customer Training Center Snecma: Training Manual CFM56-5A Engine Systems; dated Apr. 1, 2020; https://eduscol.education.fr/sti/sites/eduscol.education.fr.sti/files/ressources/pedagogiques/11659/11659-ctc-045-engine-systems.pdf; 467 pages.
Extended European Search Report; dated Aug. 24, 2020; EP Application No. 201700861—1009; 11 pages.
Extended European Search Report; dated Aug. 24, 2020; Application No. 20167171.6—1202; 8 pages.
Extended European Search Report; dated Sep. 8, 2020; Application No. 20167178.1—1202; 9 pages.

* cited by examiner

ENGINE GATEWAY WITH ENGINE DATA STORAGE

CROSS-REFERENCE TO RELATED APPLICATIONS

This application claims the benefit of priority to U.S. Provisional Application No. 62/835,169 filed Apr. 17, 2019, the disclosure of which is incorporated by reference herein in its entirety.

BACKGROUND

The subject matter disclosed herein generally relates to gas turbine engine communication systems and, more particularly, to an engine gateway with wireless communication and engine data storage for a gas turbine engine.

A control system of a gas turbine engine uses multiple configuration control items, such as control software, data, trim updatable values, and the like to control operation of the gas turbine engine and monitor performance of the gas turbine engine. Once a gas turbine engine is deployed in the field, it can be difficult to access data captured and/or computed by the control system and to make updates to the configuration control items. A gas turbine engine can be deployed in the field for an extended service life, such as a period of decades. Computer system technology and communication technology can evolve at a rapid pace adding to the challenges of interfacing with offboard systems as the offboard technology continues to advance during the lifespan of the engine.

As components are replaced on an engine, a configuration history can be tracked in various locations. If configuration history data is maintained within an engine control, the configuration history data may be lost if the engine control is swapped out.

BRIEF DESCRIPTION

According to one embodiment, an engine gateway of a gas turbine engine of an aircraft includes a communication interface configured to wirelessly communicate with an offboard system and to communicate with an engine control of the gas turbine engine, a memory system, a data storage system isolated from the memory system, and processing circuitry. The processing circuitry is configured to establish communication with the engine control on a first communication bus using system credential authentication, establish communication between the engine control and the data storage system on a second communication bus, establish wireless communication with the offboard system using system credential authentication, and provide access from the offboard system through the engine gateway, from the engine gateway through the engine control, and from the engine control to the data storage system to enable one or more updates of the data storage system by the offboard system based on service credential authentication.

In addition to one or more of the features described above or below, or as an alternative, further embodiments may include where the second communication bus provides electrical power from the engine control to the data storage system.

In addition to one or more of the features described above or below, or as an alternative, further embodiments may include where the data storage system includes a controller and one or more non-volatile memory devices.

In addition to one or more of the features described above or below, or as an alternative, further embodiments may include where the controller is configured to manage the one or more updates using a buffer that enables reversion to a previous state of one or more data records based on detecting an error condition.

In addition to one or more of the features described above or below, or as an alternative, further embodiments may include where the processing circuitry is further configured to communicate with the controller in a maintenance mode based on determining that the engine control is disconnected from the engine gateway, where the maintenance mode is enabled based on one or more of: a discrete input, a keycode, and a connection between the first communication bus and the second communication bus.

In addition to one or more of the features described above or below, or as an alternative, further embodiments may include where user credential authentication is performed in combination with system credential authentication and service credential authentication.

In addition to one or more of the features described above or below, or as an alternative, further embodiments may include where the engine gateway is mounted on a fan case of the gas turbine engine, and the engine gateway is physically separated from the engine control.

According to an embodiment, a method includes establishing communication between an engine control of a gas turbine engine of an aircraft and an engine gateway on a first communication bus using system credential authentication, establishing communication between the engine control and a data storage system of the engine gateway on a second communication bus, where the data storage system is isolated from a memory system of the engine gateway, and establishing wireless communication between the engine gateway and an offboard system using system credential authentication. The method also includes providing access from the offboard system through the engine gateway, from the engine gateway through the engine control, and from the engine control to the data storage system to enable one or more updates of the data storage system by the offboard system based on service credential authentication.

In addition to one or more of the features described above or below, or as an alternative, further embodiments may include receiving electrical power on the second communication bus at the data storage system from the engine control.

In addition to one or more of the features described above or below, or as an alternative, further embodiments may include managing, by the controller, the one or more updates using a buffer that enables reversion to a previous state of one or more data records based on detecting an error condition.

In addition to one or more of the features described above or below, or as an alternative, further embodiments may include communicating between the engine gateway and the controller in a maintenance mode based on determining that the engine control is disconnected from the engine gateway, where the maintenance mode is enabled based on one or more of: a discrete input, a keycode, and a connection between the first communication bus and the second communication bus.

According to an embodiment, a gas turbine engine of an aircraft includes a fan section with a fan case, an engine control mounted on the fan case, and an engine gateway mounted on the fan case. The engine control is configured to monitor and control operation of the gas turbine engine in real-time. The engine gateway includes a data storage system isolated from a memory system of the engine gateway and processing circuitry configured to establish communication with the engine control on a first communication bus using system credential authentication, establish communication between the engine control and the data storage system on a second communication bus, establish wireless communication with the offboard system using system credential authentication, and provide access from the offboard system through the engine gateway, from the engine gateway through the engine control, and from the engine control to the data storage system to enable one or more updates of the data storage system by the offboard system based on service credential authentication.

A technical effect of the apparatus, systems and methods is achieved by incorporating communication features to provide an engine gateway with wireless communication and engine data storage as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
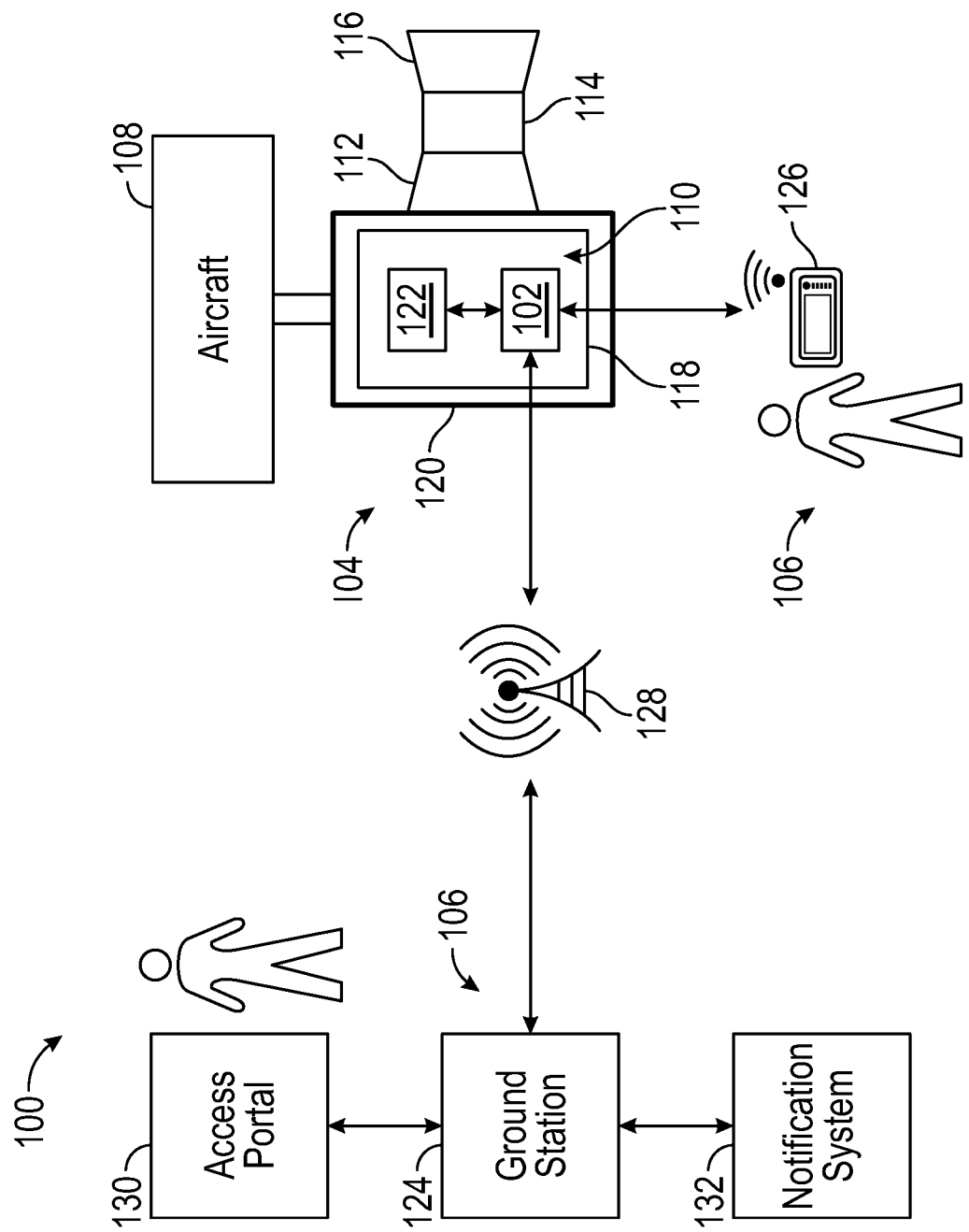
FIG. 1 is a block diagram of a system supporting wireless communication between an engine and offboard systems, in accordance with an embodiment of the disclosure.

Referring now to the drawings, FIG. 1 illustrates a system 100 supporting wireless communication between an engine gateway 102 of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and flow into the combustor section 114 then expansion through the turbine section 116. A fan case 118 of the fan section 110 can be covered by a cowling 120 and may provide an installation surface that is cooler than other sections 112-116 of the gas turbine engine 104.

An engine control 122 can be mounted on the fan case 118 and covered by the cowling 120. The engine control 122 is configured to monitor and control operation of the gas turbine engine 104 in real-time. In order to transfer configuration items, such as programs and data to and from the engine control 122, contemporary systems typically require that the cowling 120 is opened and multiple cables of bundled wires are coupled to the engine control 122. Such a process can ensure deliberate actions are taken in extracting data and performing updates to the engine control 122; however, the process can be slow and require large lengths of customized cables. In embodiments, the engine gateway 102, also referred to as a gas turbine engine communication gateway, is configured to establish communication with the engine control 122 and wireless communication with one or more offboard systems 106 external to the aircraft 108. Similar to the engine control 122, the engine gateway 102 can be mounted on the fan case 118 and covered by the cowling 120 of the gas turbine engine 104. Wireless communication can alleviate the need for customized cables or physically opening the cowling 120 to establish communication with the offboard systems 106.

The offboard systems 106 can include, for example, a ground station 124, a near-wing maintenance computer 126, an access portal 130, and/or other devices (not depicted) that may establish one-way or two-way wireless communication with the engine gateway 102. For example, a global positioning system (GPS) can provide one-way wireless signaling to the engine gateway 102 to assist in confirming a geographic location of the gas turbine engine 104 while the engine gateway 102 is coupled to the gas turbine engine 104. Wireless communication performed by the engine gateway 102 can be through a variety of technologies with different ranges supported. As one example, the engine gateway 102 can support Wi-Fi (e.g., radio wireless local area networking based on IEEE 802.11 or other applicable standards), GPS, cellular networks, satellite communication, and/or other wireless communication technologies known in the art. Wireless communication between the engine gateway 102 and the offboard systems 106 can be direct or indirect. For instance, wireless communication between the engine gateway 102 and ground station 124 may pass through one or more network interface components 128, such as a repeater, while wireless communication between the engine gateway 102 and the near-wing maintenance computer 126 may be direct wireless communication without any relay components.

The ground station 124 can enable communication with a variety of support systems, such as an access portal 130 that enables authorized users to access data, initiate tests, configure software, and perform other actions with respect to the engine control 122, where the engine gateway 102 acts as a secure gateway to limit access and interactions with the engine control 122. As another example, the ground station 124 can communicate with a notification system 132, which may trigger alerts, text messages, e-mails, and the like to authorized recipients regarding operational status of the gas turbine engine 104. The near-wing maintenance computer 126 may provide an authorized user with limited authority a capability to query the engine gateway 102 for fault data, test parameters, and other such information. In some embodiments, the near-wing maintenance computer 126 can be authorized with limited authority to make updates to select configuration parameters, software executable or data collection parameters of the engine gateway 102.

Figure 2:
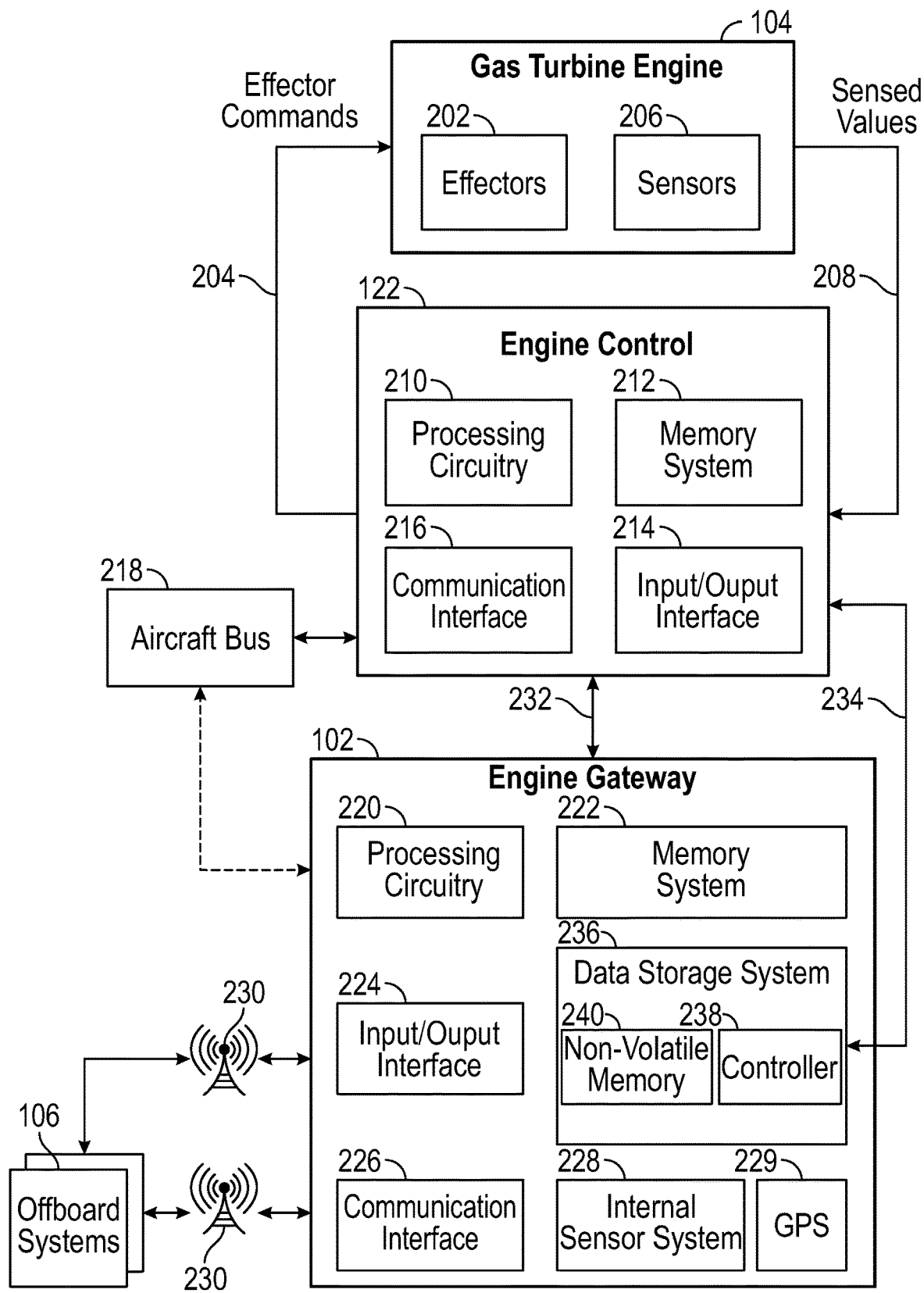
FIG. 2 is a block diagram illustrating further details of the system of FIG. 1, in accordance with an embodiment of the disclosure.

FIG. 2 is a block diagram illustrating further details of the system 100 of FIG. 1, in accordance with an embodiment of the disclosure. The engine control 122 can control effectors 202 of the gas turbine engine 104 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 104 and provide sensed values 208 as feedback to the engine control 122 to enable closed-loop control of the gas turbine engine 104 according to one or more control laws. Examples of the sensors 206 can include one or more temperature sensors, pressure sensors, strain gauges, speed sensors, accelerometers, lube sensors, and the like.

The engine control 122 can be a full authority digital engine control that includes processing circuitry 210 and a memory system 212 configured to store a plurality of configuration items, where at least one of the configuration items includes a sequence of the computer executable instructions for execution by the processing circuitry 210. Other types of configuration items can include but are not limited to data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements (not depicted). The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the engine gateway 102. The communication interface 216 may also communicate with an aircraft bus 218 of the aircraft 108 of FIG. 1. The aircraft bus 218 may provide aircraft-level parameters and commands that are used by the engine control 122 to control the gas turbine engine 104 in real-time.

Similar to the engine control 122, the engine gateway 102 can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 222 may include volatile memory, such as random access memory (RAM), and non-volatile memory, such as Flash memory, read only memory (ROM), a hard disk drive, and/or other electronic, optical, magnetic, or any other computer readable medium onto which is stored data and algorithms in a non-transitory form. The engine gateway 102 can also include an internal sensor system 228. The internal sensor system 228 can include, for example, one or more accelerometers, gyroscopes, barometers, a magnetometer (e.g., a compass), and other such sensors. Further, the engine gateway 102 can include other devices, such as a GPS receiver 229. The input/output interface 224 can process data collected from the internal sensors 228 and condition the data in a format usable by the processing circuitry 220. The communication interface 226 can interface with one or more antennas 230, which may be integrated with the engine gateway 102 or located remotely from the engine gateway 102, e.g., a shark-fin antenna mounted under or on the cowling 120 of FIG. 1. Although depicted separately in FIGS. 1 and 2, in some embodiments the engine control 122 and communication adapter 102 can be combined, for instance, where the communication adapter 102 is a module or processing core within the engine control 122.

The engine gateway 102 can act as a secure communication gateway with respect to the offboard systems 106. For example, the offboard systems 106 can request to load new/updated configuration items to the memory system 212 of the engine control 122 through the engine gateway 102. The communication interface 216 of the engine control 122 can interface to the communication interface 226 of the engine gateway 102 through a wired, optical, or magnetic coupling. The communication interface 226 can communicate wirelessly through one or more antennas 230 to the offboard systems 106. The communication interface 226 may also have access to receive data directly from the aircraft bus 218 in some embodiments. In alternate embodiments, the engine gateway 102 can send a request to the engine control 122 to provide aircraft parameters received via the aircraft bus 218 and/or engine parameters computed by the engine control 122.

Communication between the engine control 122 and the engine gateway 102 can be divided between multiple busses. For example, a first communication bus 232 can enable secure data exchange between the engine control 122 and the engine gateway 102 to support updates/inspection of the contents of the memory system 212, parameter monitoring, and other such communication. A second communication bus 234 can support interfacing the engine control 122 with a data storage system 236 of the engine gateway 102. The data storage system 236 can be isolated (e.g., physically and electrically) from the memory system 222 of the engine gateway 102. The data storage system 236 can include a controller 238 (e.g., a microcontroller) and one or more non-volatile memory devices 240. Separating the data storage system 236 physically from the engine control 122 can provide an ability to store configuration data on the gas turbine engine 104 including, for instance, a list of maintenance bulletins implemented on the specific instance of the gas turbine engine 104 to which the engine gateway 102 is attached. If the engine control 122 needs to be upgraded or replaced, the configuration data stored in the data storage system 236 remains available to the replacement version of the engine control 122. Further, data captured in the data storage system 236 can be periodically synchronized with one or more offboard systems 106.

In the example of FIG. 2, the data storage system 236 can act as an extension of the memory system 212 of the engine control 122. The non-volatile memory devices 240 may store fault data, trim values, service records, and other types of records associated with the configuration and operation of the gas turbine engine 104. Keeping the data storage system 236 isolated from the memory system 222 and processing circuitry 220 of the engine gateway 102 can prevent a risk of instructions executing on the engine gateway 102 from corrupting the contents of the data storage system 236. Thus, software developed for execution on the processing circuitry 220 may be of a lower level of criticality, requiring less development burden than software executed on the processing circuitry 210 of the engine control 122 and the controller 238. To enhance isolation, the second communication bus 234 can include electric power provided by the engine control 122. Thus, the data storage system 236 is not influenced by power interruptions within the engine gateway 102. Further, elements of the engine gateway 102 may be depowered during certain operating modes, for instance, to limit the use of wireless communication, while the data storage system 236 can remain separately powered by the engine control 122.

In some embodiments, there may be operating modes, such as a maintenance mode, where the data storage system 236 is accessible by the processing circuitry 220. Such operating modes can be limited, for instance, to conditions where the engine control 122 is not connected to the engine gateway 102. As one example, a portion of the first communication bus 232 can be looped back to the second communication bus 234 when the engine control 122 is disconnected. Other approaches to maintenance mode can include the use of discrete input to the engine gateway 102, keycodes (e.g., predetermined authorization codes) which may be written to particular addresses in the engine gateway 102, and/or other techniques. The maintenance mode may limit access to the non-volatile memory devices 240 as read-only or require particular conditions and/or credential verification to authorize write updates to the non-volatile memory devices 240.

The engine gateway 102 can manage credentials and user authentication to limit access of the memory system 212 of the engine control 122. User authentication can be defined for particular users or classes of users, such as equipment-owner users, maintenance technicians, engineering users, and the like. For example, a maintenance technician may have authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the engine gateway 102 can block access of the offboard systems 106 from reading from or writing to the memory system 212.

Configuration items received for the engine control 122 and/or the engine gateway 102 may be encrypted using various cryptographic methods to further enhance security. For example, the engine gateway 102 can apply a cryptographic algorithm using one or more parameters received and cryptographic information to decrypt an encrypted configuration item. A combination of transmitted and stored cryptographic information can be used together for decryption based on 'shared secrets' such that not all of the information is sent from the offboard systems 106 nor stored completely within the engine gateway 102. After decryption, authenticity of the configuration item can be verified using, for example, a digital signature of the configuration item. The resulting file can be a decrypted and authenticated configuration item, which may be temporarily stored in memory system 222 or otherwise buffered during authentication and passed to the engine control 122 upon authentication. Updates targeted for the data storage system 236 can be wirelessly transmitted upon credential authorization from the offboard system 106 to the engine gateway 102, communicated from the engine gateway 102 to the engine control 122 on the first communication bus 232, and communicated from the engine control 122 to the data storage system 236 on the second communication bus 234. The engine control 122 may also perform a credential authorization check prior to allowing update requests to flow from the engine control 122 to the data storage system 236.

Separating the engine gateway 102 from the engine control 122 can enable the engine gateway 102 and the engine control 122 to have different expected service life durations. For example, to stay compatible with changes in wireless communication technologies used by the offboard systems 106, the engine gateway 102 may be upgraded at a faster interval than the engine control 122. The engine gateway 102 can have a lower processing and storage capacity than the engine control 122 to reduce power requirements, weight, and other costs associated with the engine gateway 102. Since the engine gateway 102 does not actively control the gas turbine engine 104, development cycles may be reduced as compared to implementing flight critical control algorithms and hardware of the engine control 122. The data storage system 236 can be modularized (e.g., aboard, card, etc.) within a housing of the engine gateway 102 to enable swapping out or upgrading of the data storage system 236 separately from other components of the engine gateway 102.

Figure 3:
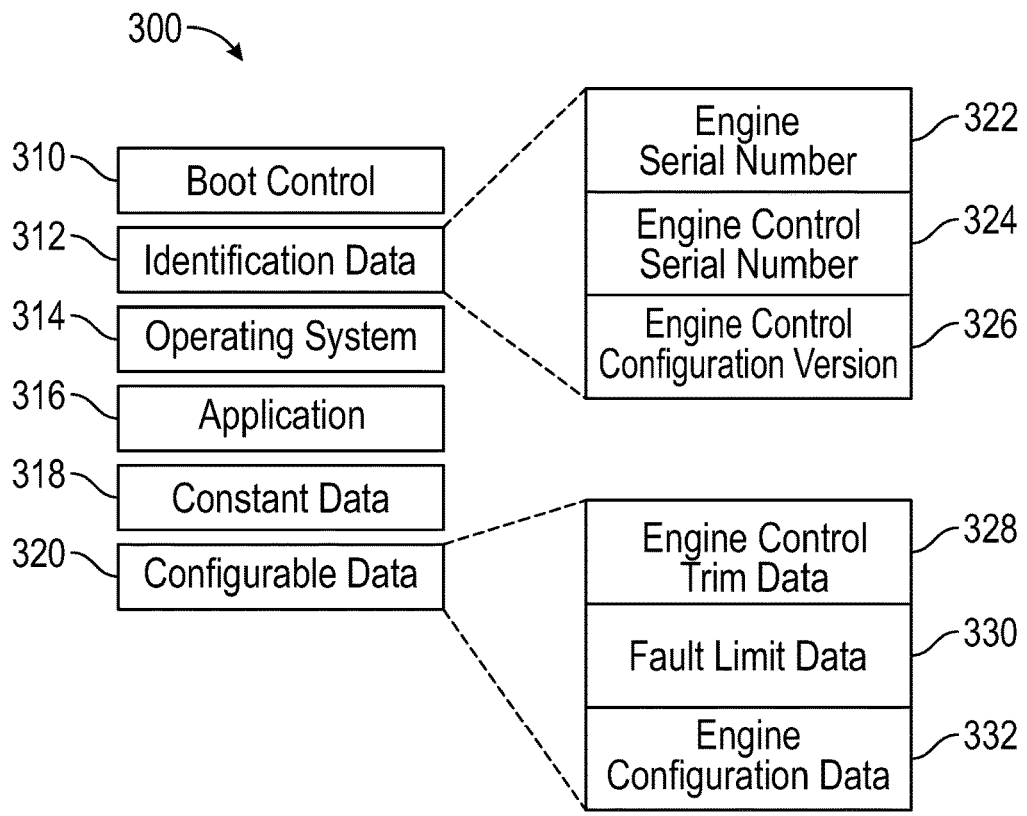
FIG. 3 is a block diagram of configuration items of an engine control, in accordance with an embodiment of the disclosure.

FIG. 3 is a block diagram of configuration items 300 of the engine control 122 of FIG. 1, in accordance with an embodiment of the disclosure. The configuration items 300 can include one or more of a boot control 310, identification data 312, an operating system 314, an application 316, constant data 318, and/or configurable data 320. Further, there can be multiple instances of the configuration items 300, such as multiple instances of the application 316, constant data 318, configurable data 320, and/or other items. The configuration items 300 can have different levels of criticality and authentication required. The boot control 310 can manage the loading and/or initialization of other configuration items 300. The identification data 312 can define a number of configuration identifiers to confirm items such as an engine serial number 322, an engine control serial number 324, an engine control configuration version 326, and other such identifiers. The operating system 314 can provide scheduling and support for one or more applications 316 to interface with various hardware elements of the engine control 122 of FIG. 1. One or more applications 316 that use constant data 318 and/or configurable data 320 can be invoked by the operating system 314. The application 316 can be, for example, configured to control operation of the gas turbine engine 104 of FIG. 1. The configurable data 320 can include adjustable parameters to tune monitoring performance and control performance of the engine control 122, such as engine control trim data 328, fault limit data 330, engine configuration data 332 and other such configurable data. In embodiments, a subset of the configuration items 300 can be stored in memory devices of the memory system 212 of FIG. 2 that are internal or external to the engine control 122. For example, the memory system 212 can include supplemental data storage, such as a data storage unit or programming plug to store configuration information, such as the identification data 312 and/or the configurable data 320. Supplemental data storage can be accessed through an alternate memory interface, such as a serial interface of the engine control 122 rather than a primary memory bus of the engine control 122 that may be used to access executable instructions of the configuration items 300 and/or various types of data.

Portions of the configuration items 300 may be stored within the data storage system 236 of FIG. 2. For example, identification data 312 and configurable data 320 may be stored in the data storage system 236 along with other types of records. The boot control 310 and/or operating system 314 can establish security protocols to reduce the risk of external threats from making unauthorized accesses or updates to the configuration items 300 and/or other items.

Figure 4:
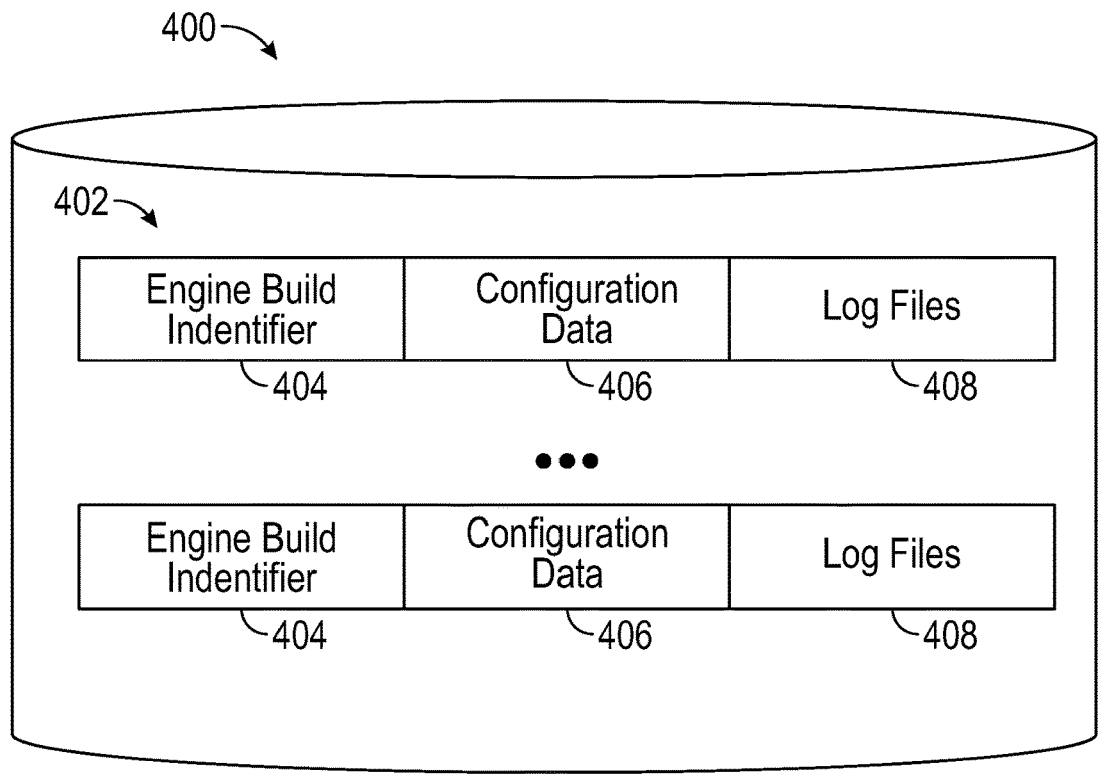
FIG. 4 is a block diagram of a configuration management database of an offboard system to track multiple engine configurations, in accordance with an embodiment of the disclosure.

FIG. 4 is a block diagram of a configuration management database 400 of an offboard system 106 of FIG. 1 to track multiple engine configurations, in accordance with an embodiment of the disclosure. For example, the configuration management database 400 can be stored at or accessible by the ground station 124 of FIG. 1 to track and verify the configuration of multiple instances of the gas turbine engine 104 of FIG. 1 and/or changes to a specific instance of the gas turbine engine 104 over a period of time. The configuration management database 400 can include, for example, a plurality of configuration records 402 that correlate data such as engine build identifier 404, configuration data 406, and log filed 408. The engine build identifier 404 can identify specific engine configurations and the configuration data 406 can include detailed data and software configuration items. For instance, the configuration data 406 may include copies or links to one or more of the configuration items 300 of FIG. 3 associated with an instance or group of gas turbine engines 104. The log files 408 can include data extracted from the engine gateway 102 of FIG. 1, which may include data locally collected by the engine gateway 102, the engine control 122 of FIG. 1, the data storage system 236, and/or the aircraft bus 218 of FIG. 2. The configuration data 406 and log files 408 may be access restricted and incorporate various security features, such as authentication requirements, encryption, digital signatures, and the like.

Figure 5:
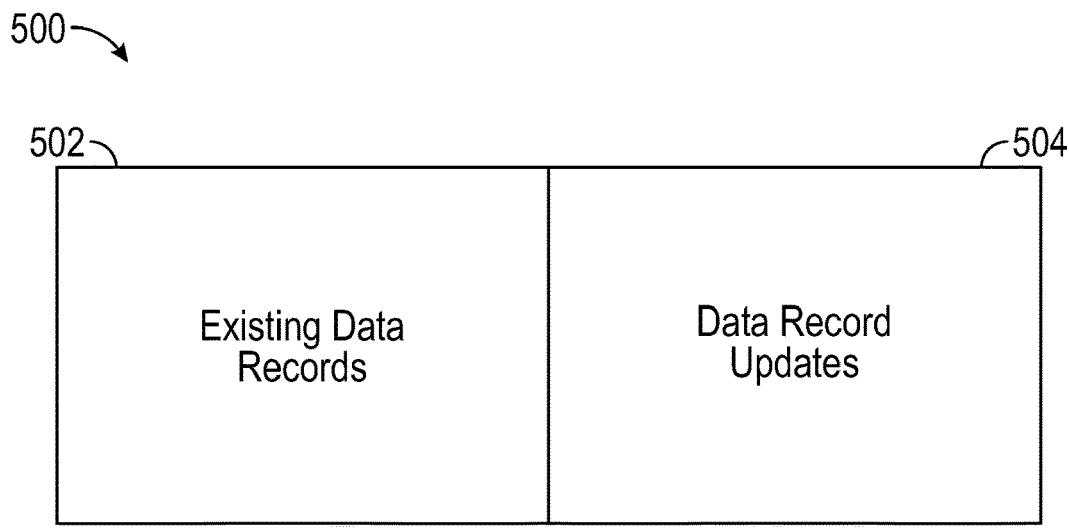
FIG. 5 is a block diagram of a buffer configuration, in accordance with an embodiment of the disclosure.

FIG. 5 is a block diagram of a configuration of a buffer 500 that can be used to manage updates to the non-volatile memory devices 240 of the data storage system 236 of FIG. 2. The buffer 500 can be implemented as a ping-pong buffer within the non-volatile memory devices 240 to store both existing data records 502 and data record updates 504. Thus, if an error occurs during an update sequence of a plurality of records, the data storage system 236 is not left in a corrupted state. The existing data records 502 enable reversion to a previous state of one or more data records based on detecting an error condition during a writing process of the data record updates 504.

Figure 6:
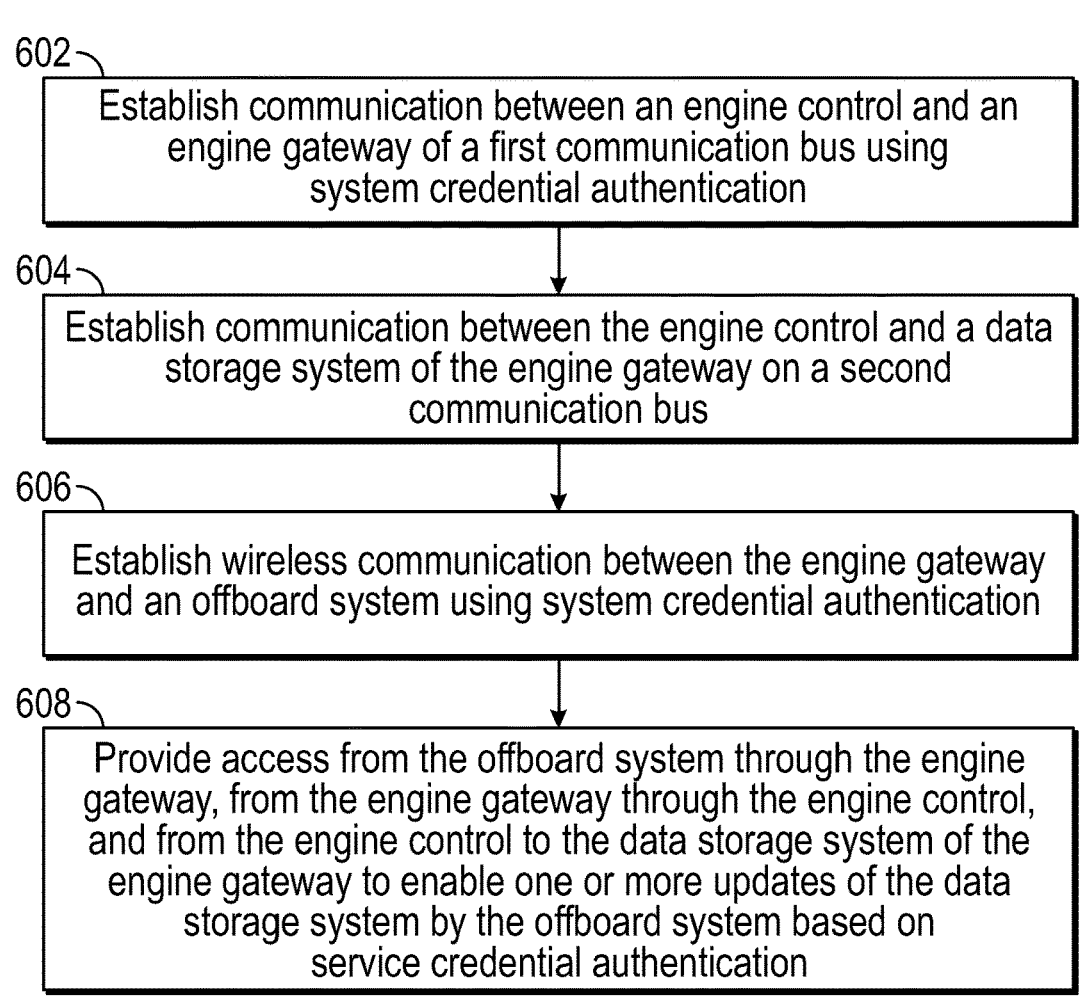
FIG. 6 is a flow chart illustrating a method, in accordance with an embodiment of the disclosure.

Referring now to FIG. 6 with continued reference to FIGS. 1-5, FIG. 6 is a flow chart illustrating a method 600 for using the engine gateway 102 of FIG. 1, in accordance with an embodiment. The method 600 may be performed, for example, by the engine gateway 102 in conjunction with the engine control 122 of FIG. 1 and at least one of the offboard systems 106 of FIG. 1.

At block 602, the engine gateway 102 can establish communication with the engine control 122 on a first communication bus 232 using system credential authentication. At block 604, the engine gateway 102 can establish communication between the engine control 122 and the data storage system 236 on a second communication bus 234. The second communication bus 234 can provide electrical power from the engine control 122 to the data storage system 236. The engine gateway 102 can be mounted on a fan case 118 of the gas turbine engine 104, and the engine gateway 102 can be physically separated from the engine control 122. The length of physical separation can impact the types of communication buses that work in a potentially high-noise environment. For example, an inter-integrated circuit (I²C) bus may not be a viable option due to the physical separation and potential induced noise on signals between the engine gateway 102 and the engine control 122. Examples of bus variations can include Ethernet, CAN, and/or other standard or custom solutions.

At block 606, the engine gateway 102 can establish wireless communication with one of the offboard systems 106 using system credential authentication. There can be multiple levels of credential authentication to verify that a user or system is authorized to establish communication and access. Authentication may include verifying a shared secret or other credential between the offboard system 106, the engine gateway 102, and/or the engine control 122. Further, service credential authentication can be used to verify a level of access granted to update specific portions of the memory system 212 of the engine control 122 and the data storage system 236. Service credential authorization can ensure that only authorized services such as inspection/monitoring or loading/modifying are allowed. Thus, in a tiered authorization approach, a user credential authorization can be combined with a system credential authorization and a service credential authorization as a type of "combination lock" access constraint for enhanced security.

At block 608, the engine gateway 102 can provide access from the offboard system 106 through the engine gateway 102, from the engine gateway 102 through the engine control 122, and from the engine control 122 to the data storage system 236 to enable one or more updates of the data storage system 236 by the offboard system based on service credential authentication. The controller 238 of the data storage system 236 can be configured to manage the one or more updates using a buffer 500 that enables reversion to a previous state of one or more data records based on detecting an error condition.

The processing circuitry 220 of the engine gateway 102 can be configured to communicate with the controller 238 in a maintenance mode based on determining that the engine control 122 is disconnected from the engine gateway 102. The maintenance mode can be enabled based on one or more of: a discrete input, a keycode, and a connection between the first communication bus 232 and the second communication bus 234.

In some embodiments, the engine gateway 102 can transmit an update completion confirmation of the engine control 122 and/or the data storage system 236 from the engine gateway 102 to the offboard system 106 based on a confirmation message from the engine control 122. The confirmation message from the engine control 122 can be sent based on validation of at least one digital signature associated with the configuration items 300 prior to updating the engine control 122. For instance, the configuration items 300 to be updated may be digitally signed at the offboard system 106 and the digitally-signed configuration items 300 can pass through the engine gateway 102 after authentication to the engine control 122 for validation. Processing circuitry 220 of the engine gateway 102 can be further configured to transmit a data state of the engine control 122 and a configuration of the engine control 122 to the offboard system 106 with the update completion confirmation. Confirmations may include a success or failure status to assist in troubleshooting unsuccessful upload attempts. The offboard system 106 can store results and state data, such as a load state and configuration, into the configuration management database 400 (e.g., as part of the configuration data 406 and/or log files 408 associated with an engine build identifier 404).

While the above description has described the flow process of FIG. 6 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine gateway of a gas turbine engine of an aircraft, the engine gateway comprising:
    a communication interface configured
        to wirelessly communicate with an offboard system; and
        to communicate with an engine control of the gas turbine engine using both a first communication bus and a second communication bus; wherein the first communication bus is distinct from the second communication bus;
    a memory system;
    a data storage system separate from the memory system; and
    processing circuitry configured to:
        provide communication with the engine control on attic first communication bus;
        provide communication between the engine control and the data storage system on the second communication bus;
        provide wireless communication with the onboard system using system credential authentication; and
        update the data storage system by receiving an update from the offboard system following system credential authentication of the onboard system, communicating the update to the engine control on the first communication bus, and receiving the update from the engine control on the second communication bus.

2. The engine gateway of claim 1, wherein the second communication bus provides electrical power from the engine control to the data storage system.

3. The engine gateway of claim 1, wherein the data storage system comprises a controller and one or more non-volatile memory devices.

4. The engine gateway of claim 3, wherein the controller is configured to manage the one or more updates using a buffer that enables reversion to a previous state of one or more data records based on detecting an error condition.

5. The engine gateway of claim 1, wherein the data storage system is physically separated from the memory system.

6. The engine gateway of claim 1, wherein communication with the engine control is performed using system credential authentication.

7. An engine gateway of a gas turbine engine of an aircraft, the engine gateway comprising:
    a communication interface configured to wirelessly communicate with an offboard system and to communicate with an engine control of the gas turbine engine;
    a memory system;
    a data storage system isolated from the memory system, the data storage system comprising a controller and one or more non-volatile memory devices; and
    processing circuitry configured to:
        establish communication with the engine control on a first communication bus using system credential authentication;
        establish communication between the engine control and the data storage system on a second communication bus;
        establish wireless communication with the offboard system using system credential authentication;
        provide access from the offboard system through the engine gateway, from the engine gateway through the engine control, and from the engine control to the data storage system to enable one or more updates of the data storage system by the offboard system based on service credential authentication; and
        communicate with the controller in a maintenance mode based on determining that the engine control is disconnected from the engine gateway, wherein the maintenance mode is enabled based on one or more of: a discrete input, a keycode, and a connection between the first communication bus and the second communication bus.

8. The engine gateway of claim 1, wherein user credential authentication is performed in combination with system credential authentication and service credential authentication.

9. The engine gateway of claim 1, wherein the engine gateway is mounted on a fan case of the gas turbine engine, and the engine gateway is physically separated from the engine control.

10. A method comprising:
    providing communication between an engine control of a gas turbine engine of an aircraft and an engine gateway on a first communication bus;
    providing communication between the engine control and a data storage system of the engine gateway on a second communication bus, wherein the data storage system is separate from a memory system of the engine gateway, and the first communication bus is distinct from the second communication bus;
    providing wireless communication between the engine gateway and an offboard system using system credential authentication; and
    updating the data storage system by receiving an update from the offboard system following system credential authentication of the offboard system, communicating the update to the engine control on the first communication bus, and receiving the update from the engine control on the second communication bus.

11. The method of claim 10, further comprising:
receiving electrical power on the second communication bus at the data storage system from the engine control.

12. The method of claim 10, wherein the data storage system comprises a controller and one or more non-volatile memory devices.

13. The method of claim 12, further comprising:
managing, by the controller, the one or more updates using a buffer that enables reversion to a previous state of one or more data records based on detecting an error condition.

14. The method of claim 12, wherein further comprising:
communicating between the engine gateway and the controller in a maintenance mode based on determining that the engine control is disconnected from the engine gateway, wherein the maintenance mode is enabled based on one or more of: a discrete input, a keycode, and a connection between the first communication bus and the second communication bus.

15. The method of claim 10, wherein user credential authentication is performed in combination with system credential authentication and service credential authentication.

16. The method of claim 10, wherein the engine gateway is mounted on a fan case of the gas turbine engine, and the engine gateway is physically separated from the engine control.

17. A gas turbine engine of an aircraft, the gas turbine engine comprising:
a fan section comprising a fan case;
an engine control mounted on the fan case, the engine control configured to monitor and control operation of the gas turbine engine in real-time; and
an engine gateway mounted on the fan case, the engine gateway comprising:
a communication interface configured
to wirelessly communicate with an offboard system; and
to communicate with an engine control of the gas turbine engine using both a first communication bus and a second communication bus, wherein the first communication bus is distinct from the second communication bus;
a memory system
a data storage system separate from the memory system; and
processing circuitry configured to:
provide communication with the engine control on the first communication bus;
provide communication between the engine control and the data storage system on the second communication bus;
provide wireless communication with the offboard system using system credential authentication; and
update the data storage system by receiving an update from the offboard system following system credential authentication of the offboard system, communicating the update to the engine control on the first communication bus, and receiving the update from the engine control on the second communication bus.

18. The gas turbine engine of claim 17, wherein the second communication bus provides electrical power from the engine control to the data storage system.

19. The gas turbine engine of claim 17, wherein the data storage system comprises a controller and one or more non-volatile memory devices.

20. The gas turbine engine of claim 19, wherein the controller is configured to manage the one or more updates using a buffer that enables reversion to a previous state of one or more data records based on detecting an error condition.

21. The gas turbine engine of claim 19, wherein the processing circuitry is further configured to:
communicate with the controller in a maintenance mode based on determining that the engine control is disconnected from the engine gateway, wherein the maintenance mode is enabled based on one or more of: a discrete input, a keycode, and a connection between the first communication bus and the second communication bus.

22. The gas turbine engine of claim 17, wherein user credential authentication is performed in combination with system credential authentication and service credential authentication.

* * * * *